United States Patent
Tsutsui et al.

(10) Patent No.: US 7,524,541 B2
(45) Date of Patent: Apr. 28, 2009

(54) MATERIAL FOR LIQUID CRYSTAL ALIGNING AND LIQUID CRYSTAL DISPLAYS MADE BY USING THE SAME

(75) Inventors: Kimiaki Tsutsui, Funabashi (JP); Takahiro Sakai, Funabashi (JP); Kohei Goto, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 395 days.

(21) Appl. No.: 10/525,800

(22) PCT Filed: Aug. 28, 2003

(86) PCT No.: PCT/JP03/10967

§ 371 (c)(1),
(2), (4) Date: Aug. 23, 2005

(87) PCT Pub. No.: WO2004/021076

PCT Pub. Date: Mar. 11, 2004

(65) Prior Publication Data

US 2006/0051525 A1     Mar. 9, 2006

(30) Foreign Application Priority Data

Aug. 29, 2002  (JP) ............................. 2002-250212

(51) Int. Cl.
G02F 1/1337    (2006.01)
C08L 79/06    (2006.01)

(52) U.S. Cl. ................... 428/1.26; 349/56; 428/1.2; 428/473.5; 528/350; 528/353

(58) Field of Classification Search .................. 428/1.2, 428/1.26, 473.5; 528/350, 353; 349/56
See application file for complete search history.

(56) References Cited

FOREIGN PATENT DOCUMENTS

| JP | 63-205640 | 8/1988 |
|---|---|---|
| JP | 64-62616 | 3/1989 |
| JP | 1-219718 | 9/1989 |
| JP | 2-287324 | 11/1990 |
| JP | 4-142515 | 5/1992 |
| JP | 7-43726 | 2/1995 |
| JP | 8-170002 | 7/1996 |
| JP | 10-104633 | 4/1998 |
| JP | 2000-44683 | 2/2000 |
| WO | WO 00/13058 | 3/2000 |

Primary Examiner—Ana L Woodward
(74) Attorney, Agent, or Firm—Oblon, Spivak, McClelland, Maier & Neustadt, P.C.

(57) ABSTRACT

To provide a liquid crystal aligning agent useful to obtain a liquid crystal alignment film which exhibits a high voltage retention characteristic even under high temperature conditions and which has a low accumulation charge, and a liquid crystal display device which is less susceptible to lowering of contrast or to image persistence.

A liquid crystal aligning agent comprising at least one selected from a polyamic acid obtained by reactive polymerization of a tetracarboxylic dianhydride component with a diamine component, and a polyimide obtained by cyclodehydration of the polyamic acid, characterized in that at least part of the tetracarboxylic dianhydride component is a tetracarboxylic dianhydride having an alicyclic structure or an aliphatic structure, and at least part of the diamine component is a diamine represented by the following formula (1):

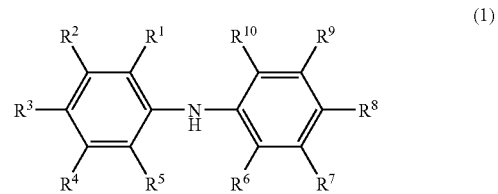

(wherein two among $R^1$ to $R^{10}$ are primary amino groups, and the rest are hydrogen atoms or monovalent organic groups other than primary amino groups, provided that they may be the same or different from one another), and a liquid crystal display device having a liquid crystal alignment film obtained from this liquid crystal aligning agent.

15 Claims, No Drawings

MATERIAL FOR LIQUID CRYSTAL ALIGNING AND LIQUID CRYSTAL DISPLAYS MADE BY USING THE SAME

TECHNICAL FIELD

The present invention relates to a liquid crystal aligning agent to be used for forming a liquid crystal alignment film, and a liquid crystal display device employing it.

BACKGROUND ART

Liquid crystal display devices are presently widely used as display devices which can realize thin structure/light weight. The display characteristics of liquid crystal display devices are known to be substantially influenced by the alignment of liquid crystal, the pretilt angle of liquid crystal, the stability of the pretilt angle, electrical characteristics, etc. In order to improve the display characteristics of such liquid crystal display devices, not only the liquid crystal material to be used but also the liquid crystal alignment film which is in direct contact with the liquid crystal and which is decisive to its alignment state, becomes important.

At present, a liquid crystal alignment film is formed mainly by using a resin solution of a polyamic acid or a polyimide as a liquid crystal aligning agent in such a manner that such a liquid crystal aligning agent is applied to a substrate, followed by baking, and the surface of the coated film is subjected to so-called rubbing treatment i.e. rubbing the surface with a rayon or nylon cloth under pressure.

A method of obtaining a liquid crystal alignment film from a polyimide or a polyamic acid as its precursor, has been widely industrially employed and is still being used, since a coated film excellent in heat resistance and solvent resistance can be prepared by such a simple process as applying a resin solution followed by baking, and liquid crystal can easily be aligned by rubbing.

Further, in order to improve the display characteristics of liquid crystal display devices, various techniques have been proposed, such as variously selecting the structure of the polyamic acid or the polyimide or blending resins having different characteristics, to further improve the liquid crystal alignment, to improve control of the pretilt angle and its stability, to improve the voltage retention, to avoid accumulation of accumulation charge against a DC voltage or to improve efficient discharge of the accumulated charge. For example, JP-A-2-287324 proposes to employ a polyimide resin having specific repeating units in order to obtain a high voltage retention. Further, JP-A-10-104633 proposes to shorten the time till the residual image disappears, by using a soluble polyimide having a nitrogen atom in addition to the imide group, against the image retention phenomenon.

However, along with the progress in high performance of liquid crystal display devices, energy saving of display devices, improvement in durability in various environments, etc., problems have become distinct such that the contrast decreases since the voltage retention in a high temperature environment is low, and that image persistence is likely to result when a charge is accumulated by continuous driving for a long time, and it is difficult to solve such two problems simultaneously only by the techniques heretofore proposed.

DISCLOSURE OF THE INVENTION

The present invention has been made in view of the above circumstances, and it is an object of the present invention to provide a liquid crystal aligning agent useful to obtain a liquid crystal alignment film which exhibits a high voltage retention characteristic even in a high temperature environment and which has a low accumulation charge, and a liquid crystal display device which is less susceptible to lowering of contract or to image persistence.

The present inventors have conducted an extensive study to solve the above problems, and as a result have accomplished the present invention. Namely, the present invention provides a liquid crystal aligning agent comprising at least one selected from a polyamic acid obtained by reactive polymerization of a tetracarboxylic dianhydride component with a diamine component, and a polyimide obtained by cyclodehydration of the polyamic acid, characterized in that at least part of the tetracarboxylic dianhydride component is a tetracarboxylic dianhydride having an alicyclic structure or an aliphatic structure, and at least part of the diamine component is a diamine represented by the following formula (1):

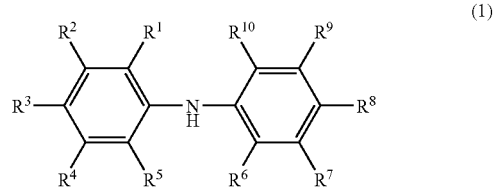

(1)

(wherein two among $R^1$ to $R^{10}$ are primary amino groups, and the rest are hydrogen atoms or monovalent organic groups other than primary amino groups, provided that they may be the same or different from one another), and a liquid crystal display device having a liquid crystal alignment film obtained from such a liquid crystal aligning agent.

BEST MODE FOR CARRYING OUT THE INVENTION

Now, the present invention will be described in detail. The liquid crystal aligning agent of the present invention comprises at least one selected from a polyamic acid obtained by reactive polymerization of a tetracarboxylic dianhydride component with a diamine component, and a polyimide obtained by cyclodehydration of the polyamic acid. However, in order to satisfy both a high voltage retention characteristic and a low charge accumulation characteristic simultaneously, it is characterized in that at least part of the tetracarboxylic dianhydride component is a tetracarboxylic dianhydride having an alicyclic structure or an aliphatic structure, and at least part of the diamine component is a diamine represented by the formula (1).

Specific examples of the tetracarboxylic dianhydride having an alicyclic structure to be used for the liquid crystal aligning agent of the present invention may, for example, be 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,4,5-tetrahydrofurantetracarboxylic dianhydride, 1,2,4,5-cyclohexanetetracarboxylic dianhydride, 2,3,5-tricarboxycyclopentylacetic dianhydride, 3,4-dicarboxy-1-cyclohexylsuccinic dianhydride, 3,4-dicarboxy-1,2,3,4-tetrahydro-1-naphthalenesuccinic dianhydride and bicyclo

[3,3,0]octane-2,4,6,8-tetracarboxylic dianhydride. The tetracarboxylic dianhydride component having an aliphatic structure may, for example, be 1,2,3,4-butanetetracarboxylic dianhydride. However, examples are not limited thereto. Further, these tetracarboxylic dianhydrides may be used alone or in combination.

Among these tetracarboxylic dianhydrides having an alicyclic structure or an aliphatic structure, in order to obtain a higher voltage retention characteristic and excellent alignment of liquid crystal, it is preferred to employ at least one tetracarboxylic dianhydride selected from 1,2,3,4-cyclobutanetetracarboxylic dianhydride, 2,3,5-tricarboxycyclopentylacetic dianhydride, 3,4-dicarboxy-1,2,3,4-tetrahydro-1-naphthalenesuccinic dianhydride, bicyclo[3,3,0]octane-2,4,6,8-tetracarboxylic dianhydride and 1,2,3,4-butanetetracarboxylic dianhydride. More preferred is to use at least one of 1,2,3,4-cyclobutanetetracarboxylic dianhydride and 3,4-dicarboxy-1,2,3,4-tetrahydro-1-naphthalenesuccinic dianhydride.

The tetracarboxylic dianhydride component to be used for the liquid crystal aligning agent of the present invention may be a combination of the above-mentioned tetracarboxylic dianhydride having an alicyclic structure or an aliphatic structure, with other tetracarboxylic dianhydride. As such other tetracarboxylic dianhydride, an aromatic tetracarboxylic dianhydride may be mentioned such as pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,3,3',4'-benzophenonetetracarboxylic dianhydride, bis (3,4-dicarboxyphenyl)ether dianhydride, bis(3,4-dicarboxyphenyl)sulfonic dianhydride, 1,2,5,6-naphthalenetetracarboxylic dianhydride, 2,3,6,7-naphthalenetetracarboxylic dianhydride or 1,4,5,8-naphthalenetetracarboxylic dianhydride. However, it is not limited thereto. Further, these other tetracarboxylic dianhydrides may be used alone or in combination of a plurality of them, in combination with the tetracarboxylic dianhydride having an alicyclic structure or an aliphatic structure.

Among such other tetracarboxylic dianhydrides, pyromellitic dianhydride, 3,3',4,4'-biphenyltetracarboxylic dianhydride, 3,3',4,4'-benzophenonetetracarboxylic dianhydride and 1,4,5,8-naphthalenetetracarboxylic dianhydride, are excellent for alignment of liquid crystal and effective to further reduce accumulation charge, although they tend to lower the voltage retention characteristic. Accordingly, in a case where it is important to further reduce accumulation charge, it is preferred to use these tetracarboxylic dianhydrides in combination with the tetracarboxylic dianhydride having an alicyclic structure or an aliphatic structure.

In the tetracarboxylic dianhydride component to be used for the liquid crystal aligning agent of the present invention, a preferred ratio of the tetracarboxylic dianhydride having an alicyclic structure or an aliphatic structure is from 20 to 100 mol %, more preferably from 50 to 100 mol %. If the ratio of the tetracarboxylic dianhydride having an alicyclic structure or an aliphatic structure, is small, there may be a case where a high voltage retention characteristic can not be obtained.

A specific example of the diamine represented by the formula (1)

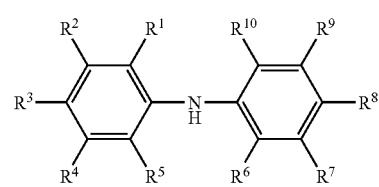

(wherein two among $R^1$ to $R^{10}$ are primary amino groups, and the rest are hydrogen atoms or monovalent organic groups other than primary amino groups, provided that they may be the same or different from one another), to be used for the liquid crystal aligning agent of the present invention, may be a diamine wherein primary amino groups are respectively attached to different benzene rings a shown by the formula (2):

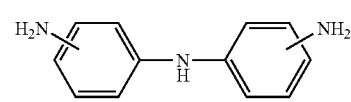

or a diamine wherein two primary amino groups are attached to the same benzene ring as shown by the formula (3):

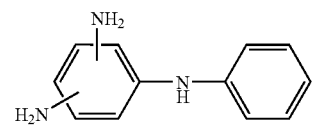

Further, hydrogen atoms on the benzene rings of these diamines may be substituted by monovalent organic groups other than primary amino groups. Such monovalent organic groups may, for example, be $C_{1-20}$ alkyl or alkenyl groups, cycloalkyl groups, phenyl groups, biphenyl groups, terphenyl groups, fluorine atoms, and combinations thereof. Among such diamines represented by the formula (1), 4,4'-diaminodiphenylamine or 2,4-diaminodiphenylamine is preferred from the viewpoint of the reactivity with the tetracarboxylic dianhydride and alignment of liquid crystal when formed into an alignment film. Most preferred is 4,4'-diaminodiphenylamine.

The diamine component to be used for the liquid crystal aligning agent of the present invention essentially contains the diamine represented by the formula (1), but may be used in combination with other diamine. The diamine which may be used in combination with the diamine represented by the formula (1), is not particularly limited. However, the following specific examples may be mentioned. Examples of an alicyclic diamine may be 1,4-diaminocyclohexane, 1,3-diaminocyclohexane, 4,4'-diaminodicyclohexylmethane, 4,4'-diamino-3,3'-dimethyldicyclohexylamine and isophoronediamine, and examples of a carbon ring type aromatic diamine may be o-phenylenediamine, m-phenylenediamine, p-phenylenediamine, diaminotoluenes (such as 2,4-diaminotoluene), 1,4-diamino-2-methoxybenzene, 2,5-diaminoxylenes, 1,3-diamino-4-chlorobenzene, 1,4-diamino-2,5-dichlorobenzene, 1,4-diamino-4-isopropylbenzene, N,N'-diphenyl-1,4-phenylenediamine, 4,4'-diaminodiphenyl-2,2'-propane, 4,4'-diaminodiphenylmethane, 2,2'-diaminostilbene, 4,4'-diaminostilbene, 4,4'-diaminodiphenyl ether, 4,4'-diphenyl thioether, 4,4'-diaminodiphenylsulfone, 3,3'-diaminodiphenylsulfone, 4,4'-diaminobenzoic acid phenyl ester, 2,2'-diaminobenzophenone, 4,4'-diaminobenzyl, bis(4-aminophenyl)phosphine oxide, bis(3-aminophenyl)methylsulfine oxide, bis(4-aminophenyl)phenylphosphine oxide, bis(4-aminophenyl)cyclohexylphosphine oxide, N,N'-bis(4-aminophenyl)-N-phenylamine, N,N-bis(4-aminephenyl)-N-methylamine, 4,4'-diaminodiphenylurea, 1,8-diaminonaphthalene, 1,5-diaminonaphthalene, 1,5-diaminoanthraquinone, diaminofluorene, bis(4-aminophenyl)diethylsilane, bis(4-aminophenyl)dimethylsilane, bis(4-aminophenyl)tetramethyldisiloxane, 3,4'-diaminodiphenylether, benzidine, 2,2'-dimethylbenzidine, 2,2-bis[4-(4-aminophenoxy)phenyl]propane, bis[4-(4-aminophenoxy)phenyl]sulfone, 4,4'-bis(4-aminophenoxy)biphenyl, 2,2-bis[4-(4-aminophenoxy)phenyl]hexafluoropropane, 1,4-bis(4-aminophenoxy)benzene and 1,3-bis(4-aminophenoxy)benzene.

Further, heterocyclic diamines may be 2,6-diaminopyridine, 2,4-diaminopyridine, 2,4-diamino-s-triazine, 2,7-diaminodibenzofuran, 2,7-diaminocarbazole, 3,7-diaminophenothiazine, 2,5-diamino-1,3,4-thiadiazole and 2,4-diamino-6-phenyl-s-triazine. Examples of an aliphatic diamine may be diaminomethane, 1,2-diaminoethane, 1,3-diaminopropane, 1,4-diaminobutane, 1,6-diaminohexane, 1,7-diaminoheptane, 1,8-diaminooctane, 1,9-diaminononane, 1,10-diaminodecane, 1,3-diamino-2,2-dimethylpropane, 1,4-diamino-2,2-dimethylbutane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, N,N'-diethyl-1,3-diaminopropane and N,N'-dimethyl-1,6-diamine.

Further, for the purpose of increasing the pretilt angle of liquid crystal, a diamine of a structure wherein an organic group known to have an effect to increase the pretilt angle if bonded to the above diamine, may be used in combination. The organic group known to have an effect to increase the pretilt angle of liquid crystal, may, for example, be a long chain alkyl group, a perfluoroalkyl group, a cyclic group having an alkyl group or a fluoroalkyl group, or a steroid skeleton group. The long chain alkyl group preferably has a carbon number of from 6 to 20, the perfluoroalkyl group preferably has a carbon number of from 1 to 12, and the alkyl group or the fluoroalkyl group of the cyclic group having an alkyl group or a fluoroalkyl group, preferably has a carbon number of from 1 to 20. Specific examples of the diamine having such an organic group bonded may be a diamine having a structure wherein a long chain alkyl group is bonded via an ether bond to the benzene ring of m-phenylenediamine, such as 1,3-diamino-4-dodecyloxybenzene, 1,3-diamino-4-hexadecyloxybenzene or 1,3-diamino-4-octadecyloxybenzene, or a diamine having a structure wherein a cyclic group having an alkyl group is likewise bonded, such as 1,3-diamino-4-[4-(4-heptylcyclohexyl)phenoxy]benzene or 1,3-diamino-4-[4-(4-pentylcyclohexyl)cyclohexyloxy]benzene. The diamine to be used in combination for the purpose of increasing the pretilt angle of liquid crystal is not limited to such examples. By increasing the amount of the diamine to be incorporated for the purpose of increasing the pretilt angle of liquid crystal, the liquid crystal aligning agent of the present invention may also be applied to vertical alignment applications.

In the diamine component to be used for the liquid crystal aligning agent of the present invention, the ratio of the diamine represented by the formula (1) contained in such diamines, is preferably from 10 to 100 mol %, more preferably from 30 to 100 mol %. If the ratio of the diamine represented by the formula (1) is too small, there may be a case where the accumulation charge can not be made to be sufficiently low, or the voltage retention characteristics can not be made sufficiently high.

The tetracarboxylic dianhydride component and the diamine component to be used for the liquid aligning agent of the present invention, may be mixed in an organic solvent and thereby reacted to form a polyamic acid, and this polyamic acid may be subjected to cyclodehydration to form a polyimide.

The method for mixing the tetracarboxylic dianhydride component and the diamine component in an organic solvent, may, for example, be a method wherein a solution having the diamine component dispersed or dissolved in an organic solvent, is stirred, and the tetracarboxylic dianhydride component is added as it is or as dispersed or dissolved in an organic solvent, or a method wherein, inversely, a diamine component is added to a solution having the tetracarboxylic dianhydride component dispersed or dissolved in an organic solvent, or a method wherein the tetracarboxylic dianhydride component and the diamine component are alternately added. In the present invention, either one of these methods may be employed. Further, in a case where the tetracarboxylic dianhydride component or the diamine component is made of a plurality of compounds, such a plurality of compounds may be reacted in a preliminarily mixed state or may individually sequentially be reacted.

The temperature at the time of reacting the tetracarboxylic dianhydride component and the diamine component in an organic solvent, is usually from 0 to 150° C., preferably from 5 to 100° C., more preferably from 10 to 80° C. The higher the temperature is, the quicker the polymerization reaction finishes. However, if it is too high, a polymer having a high molecular weight may not sometimes be obtained. Further, the reaction may be carried out at an optional concentration, but if the concentration is too low, it tends to be difficult to obtain a polymer having a high molecular weight, and if the concentration is too high, the viscosity of the reaction solution tends to be too high to carry out uniform stirring. Accordingly, it is preferably from 1 to 50 wt %, more preferably from 5 to 30 wt %. At the initial stage, the reaction may be carried out at a concentration and then, an organic solvent may be added.

The organic solvent to be used for the above reaction is not particularly limited so long as it is capable of dissolving the formed polyamic acid. However, specific examples may be N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylsulfoxide and γ-butyrolactone. These solvents may be used alone or as mixed. Further, even a solvent which is incapable of dissolving the polyamic acid may be used as mixed to the above solvent within a range not to precipitate the formed polyamic acid. Further, moisture in the organic solvent tends to impair the polymerization reaction and further may cause hydrolysis of the formed polyamic acid, and therefore, it is preferred to use the organic solvent as dehydrated and dried. The ratio of the tetracarboxylic dianhydride component:the diamine component, to be used for the polymerization reaction for the polyamic acid is preferably from 1:0.8 to 1:1.2 by molar ratio. Further, it is more preferably from 1:0.8 to 1:1, since a polyamic acid obtained in excess of the diamine component, may increase coloration of the solution. Like in a usual polycondensation reaction, the closer the molar ratio to 1:1, the larger the molecular weight of the polyamic acid to be obtained. If the molecular weight of the polyamic acid is too small, the strength of the coating film thereby obtainable may sometimes be inadequate, and inversely, if the molecular weight of the polyamic acid is too large, the viscosity of the liquid crystal alignment treating agent thereby obtainable tends to be too high, whereby the operation efficiency at the time of a coated film or the uniformity of the coated film tends to be poor. Therefore, the reduced viscosity (at a concentration of 0.5 dl/g in N-methylpyrrolidone, at 30° C.) of the polyamic acid to be used for the liquid crystal aligning agent of the present invention is preferably from 0.1 to 2.0, more preferably from 0.2 to 1.5.

The polyamic acid obtained as described above may be used as it is, as the liquid crystal aligning agent of the present invention, but may be subjected to cyclodehydration to obtain a polyimide, which may then be used. However, depending upon the structure of the polyamic acid, there may be a case wherein by the imidation reaction, it may be insolubilized and will be hardly useful as a liquid crystal aligning agent. In such a case, amic acid groups in the polyamic acid may not all be imidized, and it may be one imidized to such an extent where a proper solubility can be maintained.

The imidation reaction to cyclodehydrate the polyamic acid is usually thermal imidation wherein the solution of the polyamic acid is heated as it is, or chemical imidation wherein a catalyst is added to the solution of the polyamic acid. However, the chemical imidation wherein the imidation reaction proceeds at a relatively low temperature, is preferred, since decrease in the molecular weight of the polyimide to be obtained, is less likely to occur.

The chemical imidation can be carried out by stirring the polyamic acid in an organic solvent in the presence of a basic catalyst and an acid anhydride. The reaction temperature at that time is usually from −20 to 250° C., preferably from 0 to 180° C., and the reaction time may be from 1 to 100 hours. The amount of the basic catalyst is from 0.5 to 30 mols, preferably from 2 to 20 mols, per mol of the amic acid groups, and the amount of the acid anhydride is from 1 to 50 mols, preferably from 3 to 30 mols, per mol of amic acid groups. If the amount of the basic catalyst or the acid anhydride is too small, the reaction may not adequately proceed, and if it is too much, it tends to be difficult to completely remove it after completion of the reaction. As the basic catalyst to be used at that time, pyridine, triethylamine, trimethylamine, tributylamine or trioctylamine may, for example, be mentioned, and among them, pyridine is preferred since it has a proper basicity to let the reaction proceed. Whereas, as the acid anhydride, acetic anhydride, trimellitic anhydride or pyromellitic anhydride may, for example, be mentioned, and among them, it is preferred to employ acetic anhydride, whereby purification after completion of the reaction will be easy.

As the organic solvent, the above-mentioned solvent to be used for the preparation of the polyamic acid, may be used. The imidation rate by the chemical imidation may be controlled by adjusting the amount of the catalyst and the reaction temperature or the reaction time.

In a polyimide solution thus obtained, the added catalyst still remains in the solution. Accordingly, in order to use it for the liquid crystal aligning agent of the present invention, it is preferred that the polyimide solution is put into a poor solvent under stirring to precipitate and recover the polyimide. The poor solvent to be used for the precipitation and recovery of the polyimide is not particularly limited, and it may, for example, be methanol, acetone, hexane, butylcellosolve, heptane, methyl ethyl ketone, methyl isobutyl ketone, ethanol, toluene or benzene. The polyimide precipitated by being put into the poor solvent, may be recovered by filtration and washing and then dried under atmospheric pressure or reduced pressure at room temperature or under heating, to obtain a powder. The polyimide may be purified by repeating an operation of further dissolving this powder in a good solvent, followed by reprecipitation, preferably from 2 to 10 times. In a case where impurities can not be removed by a single operation of recovery by precipitation, it is preferred to carry out such a purification step. It is preferred to use, as the poor solvent, at least three types of poor solvents such as alcohols, ketones or hydrocarbons, since it is thereby possible to further increase the efficiency for purification.

Further, the polyamic acid may also be recovered by precipitation and purified by a similar operation. In a case where it is desired not to have the solvent used for the polymerization of the polyamic acid incorporated in the liquid crystal aligning agent of the present invention or in a case where an unreacted monomer component or impurities are present in the reaction solution, this recovery by precipitation and purification may be carried out.

The liquid crystal aligning agent of the present invention is one containing at least either the above-mentioned polyamic acid having a specific structure or the polyimide having such a polyamic acid cyclodehydrated, but usually takes a construction of a resin solution having such a resin dissolved in an organic solvent. To obtain such a resin solution, the reaction solution of the polyamic acid or the polyimide may be used as it is, or one recovered by precipitation from the reaction solution may be re-dissolved in an organic solvent.

Such an organic solvent is not particularly limited so long as it is capable of dissolving the resin component to be contained, but specific examples thereof may be N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide and γ-butyrolactone. These solvents may be used alone or in combination as a mixture of a plurality of them.

Further, even a solvent which is incapable of dissolving the resin component alone may be mixed to the liquid crystal aligning agent of the present invention within a range not to let the resin component precipitate. Especially, it is possible to improve the uniformity of the coated film at the time of coating on the substrate by properly mixing a solvent having a low surface tension, such as ethylcellosolve, butylcellosolve, ethylcarbitol, butylcarbitol, ethylcarbitol acetate, ethylene glycol, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy)propanol, lactic acid methyl ester, lactic acid ethyl ester, lactic acid n-propyl ester, lactic acid n-butyl ester or lactic acid isoamyl ester.

The solid content concentration in the liquid crystal aligning agent of the present invention may suitably be changed depending upon the setting of the thickness of the liquid crystal alignment film to be formed, but it is preferably from 1 to 10 wt %. If the solid content concentration is less than 1 wt %, it tends to be difficult to form a coated film which is uniform and flawless, and if it is larger than 10 wt %, the storage stability of the solution may sometimes be poor.

Further, to the liquid crystal aligning agent of the present invention, in order to improve the adhesion of the coated film to the substrate, an additive such as a silane coupling agent may be added, or two or more polyamic acids or polyimides may be mixed, or other resin component may be incorporated.

The liquid crystal aligning agent obtained as described above, is subjected to filtration and then applied to a substrate, followed by drying and baking to form a coated film, and this coated film surface is subjected to alignment treatment such as rubbing or irradiation with light, so that it may be used as a liquid crystal alignment film.

As the substrate to be used at that time is not particularly limited so long as it is a highly transparent substrate, and it is possible to employ a glass substrate or a plastic substrate such as an acrylic substrate or a polycarbonate substrate. It is particularly preferred to employ a substrate having ITO electrodes, etc. formed for liquid crystal driving with a view to simplification of the process. Further, in the case of a reflection type liquid crystal display device, an opaque material such as a silicon wafer may be used for a substrate for one side, and for the electrodes in such a case may be made of a material which reflects lights, such as aluminum.

As the method for applying the liquid crystal aligning agent, a spin coating method, a printing method or an inkjet method may, for example, be mentioned. However, from the viewpoint of the productivity, a transfer printing method is industrially widely employed, and it may suitably be employed also for the liquid crystal aligning agent of the present invention.

The step of drying after application of the liquid crystal aligning agent is not necessarily required, but it is preferred to include a drying step in a case where the time after the application to the baking is not constant for every substrate or in a case where baking is not immediately carried out after the application. Such drying may be carried out until the solvent is evaporated to such an extent that the coated film shape will not be deformed by e.g. transportation of the substrate. The drying means is not particularly limited. As a specific example, a method may be employed wherein drying is carried out for from 0.5 to 30 minutes, preferably from 1 to 5 minutes, on a hot plate of from 50 to 150° C., preferably from 80 to 120° C.

The baking of the liquid crystal aligning agent can be carried out at an optional temperature of from 100 to 350° C., preferably from 150 to 300° C., further preferably from 200 to 250° C. In a case where a polyamic acid is incorporated into the liquid crystal aligning agent, the conversion rate from the polyamic acid to the polyimide may change depending upon this baking temperature, but the liquid crystal aligning agent of the present invention is not required to be imidated 100%. However, it is preferred to carry out baking at a temperature higher by at least 10° C. than the heat treatment temperature such as curing of a sealing agent, which is required in the step of producing a liquid crystal cell.

The thickness of the coated film after baking is from 5 to 300 nm, preferably from 10 to 100 nm, since if it is too thick, such will be disadvantageous from the viewpoint of the power consumption of the liquid crystal display device, and if it is too thin, the reliability of the liquid crystal display device may sometimes decrease.

The liquid crystal display device of the present invention is one prepared in such a manner that a substrate provided with a liquid crystal alignment film is obtained from the liquid crystal aligning agent of the present invention by the above-described method, and then a liquid crystal cell is prepared by a known method to obtain a liquid crystal display device. As an example for the preparation of a liquid crystal cell, a method is common wherein a pair of substrates having liquid crystal alignment films formed thereon are placed with a spacer of from 1 to 30 μm, preferably from 2 to 10 μm, interposed therebetween, so that the rubbing directions will be at an optional angle of from 0 to 270°, their periphery is fixed by a sealing agent, then liquid crystal is injected, followed by sealing. The method for sealing liquid crystal is not particularly limited, and it may, for example, be a vacuum method wherein liquid crystal is injected after reducing the pressure in the liquid crystal cell thus prepared, or a dropping method wherein liquid crystal is dropped, followed by sealing.

The liquid crystal display device prepared by using the liquid crystal aligning agent of the present invention, in such a manner, has excellent electrical characteristics and thus can be made to be a liquid crystal display device which is less susceptible to lowering of contrast or to image persistence. Thus, it is suitably employed for display devices of various systems employing nematic liquid crystal, such as a TN device, a STN device, a TFT liquid crystal device and further an in-plane switching liquid crystal display device or a vertically aligned liquid crystal display device. Further, by selecting the liquid crystal to be used, it may be used also for a ferroelectric or antiferroelectric liquid crystal display device.

Now, the present invention will be described in further detail with reference to Examples. However, it should be understood that the present invention is by no means restricted to such specific examples.

EXAMPLES

Abbreviations to be used in the present Examples are as follows. Further, each of the reduced viscosities of polyamic acids and polyimides is a value measured at 30° C. in NMP having a concentration of 0.5 g/dl.

Tetracarboxylic Dianhydrides
CBDA: 1,2,3,4-cyclobutanetetracarboxylic dianhydride
TDA: 3,4-dicarboxy-1,2,3,4-tetrahydro-1-naphthalene succinic dianhydride
BDA: 1,2,3,4-butanetetracarboxylic dianhydride
BODA: bicyclo[3,3,0]octane-2,4,6,8-tetracarboxylic dianhydride
PMDA: pyromellitic dianhydride Diamines
4,4'DADPA: 4,4'-diaminodiphenylamine
2,4DADPA: 2,4-diaminodiphenylamine
DADOB: 1,3-diamino-4-dodecyloxybenzene
p-PDA: p-phenylenediamine
BAPB: 1,3-bis(4-aminophenoxy)benzene
DDM: 4,4'-diaminodiphenylmethane
DDE: 4,4'-diaminodiphenyl ether
DABA: 4,4'-diaminobenzanilide
DAP: 2,6-diaminopyridine Organic Solvents
NMP: N-methyl-2-pyrrolidone
BCS: butylcellosolve
GBL: γ-butyrolactone Preparation Example 1

CBDA/4,4'DADPA 19.61 g (0.1 mol) of CBDA as the tetracarboxylic dianhydride component and 18.73 g (0.094 mol) of 4,4'DADPA as the diamine component were mixed in 345.1 g of NMP and reacted for 5 hours at room temperature to obtain a polyamic acid solution. The polymerization reaction proceeded easily and uniformly, and the reduced viscosity of the obtained polyamic acid was 1.18 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 2

CBDA/2,4DADPA 19.22 g (0.098 mol) of CBDA as the tetracarboxylic dianhydride component and 19.93 g (0.1 mol) of 2,4DADPA as the diamine component were mixed in 221.8 g of NMP and reacted for 5 hours at room temperature to obtain a polyamic acid solution. The polymerization reaction proceeded easily and uniformly, and the reduced viscosity of the obtained polyamic acid was 0.97 dl/g. Further, NMP and BCS were added so that this solution comprised 4 wt % of the polyamic acid, 76 wt % of NMP and 20 wt % of BCS, to obtain a liquid crystal aligning agent of the present invention.

Preparation Example 3

CBDA/4,4'DADPA/DADOB(10)

19.41 g (0.099 mol) of CBDA as the tetracarboxylic dianhydride component, and 17.93 g (0.09 mol) of 4,4'DADPA and 2.92 g (0.01 mol) of DADOB, as the diamine component, were mixed in 362.4 g of NMP and reacted for 5 hours at room temperature to obtain a polyamic acid solution. The polymerization reaction proceeded easily and uniformly, and the reduced viscosity of the obtained polyamic acid was 1.50 dl/g. Further, NMP and BCS were added so that this solution comprised 3 wt % of the polyamic acid, 77 wt % of NMP and 20 wt % of BCS, to obtain a liquid crystal aligning agent of the present invention.

Preparation Example 4

TDA/4,4'DADPA 30.03 g (0.1 mol) of TDA as the tetracarboxylic dianhydride component and 19.53 g (0.098 mol) of 4,4'DADPA as the diamine component were mixed in 446.0 g of NMP and reacted for 24 hours at room temperature to obtain a polyamic acid solution. The polymerization reaction proceeded easily and uniformly, and the reduced viscosity of the obtained polyamic acid was 1.10 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 5

CBDA/4,4'DADPA/p-PDA(50)

19.61 g (0.1 mol) of CBDA as the tetracarboxylic dianhydride component, and 9.96 g (0.05 mol) of 4,4'DADPA and 4.76 g (0.044 mol) of p-PDA, as the diamine component, were mixed in 309 g of NMP and reacted for 10 hours at room temperature to obtain a polyamic acid solution. The polymerization reaction proceeded easily and uniformly, and the reduced viscosity of the obtained polyamic acid was 1.05 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 6

CBDA/4,4'DADPA/BAPB(50)

19.61 g (0.1 mol) of CBDA as the tetracarboxylic dianhydride component, and 9.96 g (0.05 mol) of 4,4'DADPA and 13.45 g (0.046 mol) of BAPB, as the diamine component, were mixed in 387 g of NMP and reacted for 5 hours at room temperature to obtain a polyamic acid solution. The polymerization reaction proceeded easily and uniformly, and the reduced viscosity of the obtained polyamic acid was 1.13 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 7

CBDA/4,4'DADPA/BAPB(70)

19.61 g (0.1 mol) of CBDA as the tetracarboxylic dianhydride component, and 5.98 g (0.03 mol) of 4,4'DADPA and 19.59 g (0.067 mol) of BAPB, as the diamine component, were mixed in 406.6 g of NMP and reacted for 5 hours at room temperature to obtain a polyamic acid solution. The polymerization reaction proceeded easily and uniformly, and the reduced viscosity of the obtained polyamic acid was 1.18 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 8

CBDA/4,4'DADPA/p-PDA(90)

19.61 g (0.1 mol) of CBDA as the tetracarboxylic dianhydride component, and 1.99 g (0.01 mol) of 4,4'DADPA and 9.08 g (0.084 mol) of p-PDA, as the diamine component, were mixed in 276.2 g of NMP and reacted for 5 hours at room temperature to obtain a polyamic acid solution. The polymerization reaction proceeded easily and uniformly, and the reduced viscosity of the obtained polyamic acid was 1.45 dl/g. Further, NMP and BCS were added so that this solution comprised 4 wt % of the polyamic acid, 76 wt % of NMP and 20 wt % of BCS, to obtain a liquid crystal aligning agent of the present invention.

Preparation Example 9

CBDA/PMDA(20)/4,4'DADPA/p-PDA(50)

19.69 g (0.08 mol) of CBDA and 4.36 g (0.02 mol) of PMDA, as the tetracarboxylic dianhydride component, and 9.96 g (0.05 mol) of 4,4'DADPA and 4.65 g (0.043 mol) of p-PDA, as the diamine component, were mixed in 312 g of NMP and reacted for 5 hours at room temperature to obtain a polyamic acid solution. The polymerization reaction proceeded easily and uniformly, and the reduced viscosity of the obtained polyamic acid was 1.28 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 10

BODA/4,4'DADPA 25.02 g (0.1 mol) of BODA as the tetracarboxylic dianhydride component and 19.53 g (0.098 mol) of 4,4'DADPA as the diamine component, were mixed in 252.4 g of NMP and reacted for 20 hours at room temperature to obtain a polyamic acid solution. The polymerization reaction proceeded easily and uniformly, and the reduced viscosity of the obtained polyamic acid was 0.68 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 11

BDA/4,4'DADPA 19.81 g (0.1 mol) of BDA as the tetracarboxylic dianhydride component and 19.93 g (0.1 mol) of 4,4'DADPA as the diamine component, were mixed in 225.2 g of NMP and reacted for 20 hours at room temperature to obtain a polyamic acid solution. The polymerization reaction proceeded easily and uniformly, and the reduced viscosity of the obtained polyamic acid was 0.62 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 12

CBDA/PMDA(50)/4,4'DADPA 9.81 g (0.05 mol) of CBDA and 10.91 g (0.05 mol) of PMDA, as the tetracarboxylic dianhydride component, and 19.13 g (0.096 mol) of 4,4'DADPA as the diamine component, were mixed in 358.5 g of NMP and reacted for 5 hours at room temperature to obtain a polyamic acid solution. The polymerization reaction proceeded easily and uniformly, and the reduced viscosity of the obtained polyamic acid was 0.95 dl/g. Further, NMP and BCS were added so that this solution comprised 5 wt % of the polyamic acid, 75 wt % of NMP and 20 wt % of BCS, to obtain a liquid crystal aligning agent of the present invention.

Preparation Example 13

CBDA/PMDA(80)/4,4'DADPA 3.92 g (0.02 mol) of CBDA and 17.45 g (0.08 mol) of PMDA, as the tetracarboxylic dianhydride component, and 18.53 g (0.093 mol) of 4,4'DADPA as the diamine component, were mixed in 359.1 g of NMP and reacted for 5 hours at room temperature to obtain a polyamic acid solution. The polymerization reaction proceeded easily and uniformly, and the reduced viscosity of the obtained polyamic acid was 1.70 dl/g. Further, NMP and BCS were added so that this solution comprised 4 wt % of the polyamic acid, 76 wt % of NMP and 20 wt % of BCS, to obtain a liquid crystal aligning agent of the present invention.

Preparation Example 14

TDA/4,4'DADPA[SPI]

30.03 g (0.1 mol) of TDA as the tetracarboxylic dianhydride component and 19.53 g (0.098 mol) of 4,4'DADPA as the diamine component, were mixed in 446.0 g of NMP and reacted for 24 hours at room temperature to obtain a polyamic acid solution. 50 g of this polyamic acid solution was diluted by NMP to 3 wt %, and 10.2 g of acetic anhydride and 4.8 g of pyridine were added as imidation catalysts and reacted for 3 hours at 40° C. This reaction solution was put into 600 ml of methanol, and the obtained precipitate was collected by filtration, thoroughly washed with methanol and then dried under reduced pressure at 80° C. to obtain a reddish brown polyimide powder. The reduced viscosity of the obtained polyimide was 1.08 dl/g. 1.0 g of this polyimide powder was dissolved in 16.0 g of GBL and 3.0 g of BCS, to obtain a liquid crystal aligning agent of the present invention.

Comparative Preparation Example 1

CBDA/DDM/DADOB(10)

19.41 g (0.099 mol) of CBDA as the tetracarboxylic dianhydride component, and 17.84 g (0.09 mol) of DDM and 2.92 g (0.01 mol) of DADOB, as the diamine component, were mixed in 227.7 g of NMP and reacted for 20 hours at room temperature to obtain a polyamic acid solution. The polymerization reaction proceeded easily and uniformly, and the reduced viscosity of the obtained polyamic acid was 0.84 dl/g. Further, NMP and BCS were added so that this solution comprised 5 wt % of the polyamic acid, 75 wt % of NMP and 20 wt % of BCS, to obtain a liquid crystal aligning agent for comparison.

Comparative Preparation Example 2

CBDA/DDE/DADOB(10)

19.22 g (0.098 mol) of CBDA as the tetracarboxylic dianhydride component, and 18.02 g (0.09 mol) of DDE and 2.92 g (0.01 mol) of DADOB, as the diamine component, were mixed in 227.6 g of NMP and reacted for 20 hours at room temperature to obtain a polyamic acid solution. The polymerization reaction proceeded easily and uniformly, and the reduced viscosity of the obtained polyamic acid was 1.24 dl/g. Further, NMP and BCS were added so that this solution comprised 4 wt % of the polyamic acid, 76 wt % of NMP and 20 wt % of BCS, to obtain a liquid crystal aligning agent for comparison.

Comparative Preparation Example 3

CBDA/DABA/DADOB(10)

19.22 g (0.098 mol) of CBDA as the tetracarboxylic dianhydride component, and 20.45 g (0.09 mol) of DABA and 2.92 g (0.01 mol) of DADOB, as the diamine component, were mixed in 230 g of GBL and reacted for 20 hours at room temperature to obtain a polyamic acid solution. The polymerization reaction proceeded easily and uniformly, and the reduced viscosity of the obtained polyamic acid was 1.48 dl/g. Further, NMP, GBL and BCS were added so that this solution comprised 4 wt % of the polyamic acid, 46 wt % of NMP, 30 wt % of GBL and 20 wt % of BCS, to obtain a liquid crystal aligning agent for comparison.

Comparative Preparation Example 4

CBDA/DDM 19.22 g (0.098 mol) of CBDA as the tetracarboxylic dianhydride component and 19.83 g (0.1 mol) of DDM as the diamine component were mixed in 221.3 g of NMP and reacted for 24 hours at room temperature to obtain a polyamic acid solution. The polymerization reaction proceeded easily and uniformly, and the reduced viscosity of the obtained polyamic acid was 1.40 dl/g. Further, NMP and BCS were added so that this solution comprised 4 wt % of the polyamic acid, 76 wt % of NMP and 20 wt % of BCS, to obtain a liquid crystal aligning agent for comparison.

Comparative Preparation Example 5

TDA/DDM 29.73 g (0.099 mol) of TDA as the tetracarboxylic dianhydride component and 19.83 g (0.1 mol) of DDM as the diamine component were mixed in 280.8 g of NMP and reacted for 24 hours at room temperature to obtain a polyamic acid solution. The polymerization reaction proceeded easily and uniformly, and the reduced viscosity of the obtained polyamic acid was 0.60 dl/g. Further, NMP and BCS were added so that this solution comprised 5 wt % of the polyamic acid, 75 wt % of NMP and 20 wt % of BCS, to obtain a liquid crystal aligning agent for comparison.

Comparative Preparation Example 6

CBDA/p-PDA 19.61 g (0.1 mol) of CBDA as the tetracarboxylic dianhydride component and 10.38 g (0.096 mol) of p-PDA as the diamine component were mixed in 344.9 g of NMP and reacted for 5 hours at room temperature, to obtain a polyamic acid solution. The polymerization reaction proceeded easily and uniformly, and the reduced viscosity of the obtained polyamic acid was 1.20 dl/g. Further, NMP and BCS were added so that this solution comprised 4 wt % of the polyamic acid, 76 wt % of NMP and 20 wt % of BCS to obtain a liquid crystal aligning agent for comparison.

Comparative Preparation Example 7

CBDA/BAPB 18.63 g (0.095 mol) of CBDA as the tetracarboxylic dianhydride component and 29.23 g (0.1 mol) of BAPB as the diamine component were mixed in 271.2 g of NMP and reacted for 10 hours at room temperature to obtain a polyamic acid solution. The polymerization reaction proceeded easily and uniformly, and the reduced viscosity of the obtained polyamic acid was 0.72 dl/g. Further, NMP and BCS were added so that this solution comprised 5 wt % of the polyamic acid, 75 wt % of NMP and 20 wt % of BCS, to obtain a liquid crystal aligning agent for comparison.

Comparative Preparation Example 8

TDA/DAP [SPI]

30.03 g (0.1 mol) of TDA as the tetracarboxylic dianhydride component and 10.91 g (0.1 mol) of DAP as the diamine component, were mixed in 95.5 g of NMP and reacted for 24 hours at room temperature to obtain a polyamic acid solution. 50 g of this polyamic acid solution was diluted by NMP to 8 wt %, and 37.4 g of acetic anhydride and 17.4 g of pyridine were added as imidation catalysts and reacted for 3 hours at 40° C. This reaction solution was put into 800 ml of methanol, and the obtained precipitate was collected by filtration, thoroughly washed with water and then dried under reduced pressure at 80° C. to obtain a white polyimide powder. The reduced viscosity of the obtained polyimide was 0.50 dl/g. 3.5 g of this polyimide powder was dissolved in 39 g of GBL and 7.5 g of BCS, to obtain a liquid crystal aligning agent for comparison.

Example 1

The liquid crystal aligning gent of the present invention obtained in Preparation Example 1 was spin-coated on a glass substrate provided with transparent electrodes, dried for 5 minutes on a hot plate of 80° C. and then baked at 60 minutes in a hot air circulation oven at 250° C. to form a coated film having a thickness of 100 nm. This coated surface was subjected to rubbing by means of a rayon cloth by a rubbing apparatus having a roll diameter of 120 mm under conditions of a roll rotational speed of 300 rpm, a roll advancing speed of 20 mm/sec and a pushing amount of 0.5 mm, to obtain a substrate provided with a liquid crystal alignment film.

To evaluate the electrical characteristics of a liquid crystal cell, two sheets of the above substrate provided with a liquid crystal alignment film, were prepared, a spacer of 6 μm was sprayed on a liquid crystal alignment film of one sheet, then a sealing agent was printed thereon, and the other substrate was bonded so that the liquid alignment film surfaces faced each other, and the rubbing directions crossed each other, whereupon the sealing agent was cured to prepare a void cell. To this void cell, liquid crystal MLC-2003 (manufactured by Merck Japan Limited) was injected by a reduced pressure injection method, and the injection inlet was sealed to obtain a twist nematic liquid crystal cell.

Evaluation of Voltage Retention Characteristics

To the above liquid crystal cell, a voltage of 4 V was applied for 60 μs at a temperature of 23° C., and the voltage after 16.67 ms was measured, whereby to what extent the voltage was maintained, was calculated as a voltage retention. Further, a similar measurement was carried out also at a temperature of 90° C. As a result, the voltage retention at 23° C. was 99.4%, and the voltage retention at 90° C. was 96.2%.

Evaluation of Charge Accumulation Characteristics

Rectangular waves of 30 Hz/±3 V having a DC voltage of 3 V superimposed were applied to the above liquid crystal cell for 60 minutes at a temperature of 23° C., and the residual voltage remaining in the liquid crystal cell immediately after switching off the DC 3 V was measured by an optical flicker elimination method. As a result, the accumulation charge was 0 V.

Example 2 and Example 3

Using the liquid crystal aligning agents of the present invention obtained in Preparation Example 2 and Preparation Example 3, evaluation was carried out in the same manner as in Example 1. The results are shown in Table 1 given hereinafter.

Comparative Examples 1 to 3

Using the liquid crystal aligning agents obtained in Comparative Preparation Examples 1 to 3, evaluation was carried out in the same manner as in Example 1. The results are shown in Table 1 given below.

TABLE 1

| | Liquid crystal aligning agent | Resin components | Voltage retention (%) 23° C. | Voltage retention (%) 90° C. | Accumulation charge (V) |
|---|---|---|---|---|---|
| Ex. 1 | Prep. Ex. 1 | CBDA/4,4'DADPA | 99.4 | 96.2 | 0 |
| Ex. 2 | Prep. Ex. 2 | CBDA/2,4DADPA | 99.1 | 91.5 | 0.1 |
| Ex. 3 | Prep. Ex. 3 | CBDA/4,4'DADPA/DADOB(10) | 99.6 | 95.1 | 0 |
| Comp. Ex. 1 | Comp. Prep Ex. 1 | CBDA/DDM/DADOB(10) | 99.6 | 96.8 | 0.9 |
| Comp. Ex. 2 | Comp. Prep. Ex. 2 | CBDA/DDE/DADOB(10) | 99.4 | 89.6 | 1.6 |
| Comp. Ex. 3 | Comp. Prep. Ex. 3 | CBDA/DABA/DADOB(10) | 98.9 | 74.5 | 1.7 |

Example 4

Using the liquid crystal aligning agent of the present invention obtained in Preparation Example 1, evaluation was carried out in the same manner as in Example 1. However, differences in the characteristics due to the baking temperatures were compared by changing the conditions of baking the liquid crystal aligning agent to at 200° C. for 30 minutes, at 230° C. for 30 minutes, at 250° C. for 30 minutes, and at 300° C. for 30 minutes, respectively. The results are shown in Table 2 given hereinafter.

Example 5

Using the liquid crystal aligning agent of the present invention obtained in Preparation Example 4, evaluation was carried out in the same manner as in Example 4. The results are shown in Table 2 given hereinafter.

Comparative Example 4 and Comparative Example 5

Using the liquid crystal aligning agents obtained in Comparative Preparation Example 4 and Comparative Preparation Example 5, evaluation was carried out in the same manner as in Example 4. The results are shown in Table 2 given hereinafter.

TABLE 2

| | Liquid crystal aligning agent | Resin components | Baking temperature of liquid crystal aligning agent | Voltage retention (%) 23° C. | Voltage retention (%) 90° C. | Accumulation charge (V) |
|---|---|---|---|---|---|---|
| Ex. 4 | Prep. Ex. 1 | CBDA/4,4'DADPA | 200° C. | 98.3 | 84.3 | 0 |
| | | | 230° C. | 98.6 | 92.4 | 0 |
| | | | 250° C. | 99.4 | 96.4 | 0 |
| | | | 300° C. | 99.6 | 96.9 | 0 |
| Ex. 5 | Prep. Ex. 4 | TDA/4,4'DADPA | 200° C. | 99.4 | 80.4 | 0 |
| | | | 230° C. | 99.5 | 87.8 | 0 |
| | | | 250° C. | 99.6 | 92.2 | 0 |
| | | | 300° C. | 99.6 | 91.3 | 0 |
| Comp. Ex. 4 | Comp. Prep. Ex. 4 | CBDA/DDM | 200° C. | 98.8 | 81.5 | 0.7 |
| | | | 230° C. | 98.8 | 91.8 | 0.9 |
| | | | 250° C. | 99.4 | 93.3 | 1.0 |
| | | | 300° C. | 99.5 | 94.1 | 1.5 |
| Comp. Ex. 5 | Comp. Prep. Ex. 5 | TDA/DDM | 200° C. | 99.0 | 82.8 | 0.9 |
| | | | 230° C. | 99.0 | 91.6 | 1.0 |
| | | | 250° C. | 99.3 | 91.9 | 1.0 |
| | | | 300° C. | 98.6 | 91.9 | 1.7 |

Examples 6 to 15

Using the liquid crystal aligning agents of the present invention obtained in Preparation Examples 5 to 14, evaluation was carried out in the same manner as in Example 1. However, the conditions of baking the liquid crystal aligning agents were changed to at 220° C. for 30 minutes. The results are shown in Table 3 given hereinafter.

Comparative Examples 6 to 8

Using the liquid crystal aligning agents obtained in Comparative Preparation Examples 6 to 8, evaluation was carried out in the same manner as in Example 1. However, the conditions of baking the liquid crystal aligning agents were changed to at 220° C. for 30 minutes. The results are shown in Table 3 given hereinafter.

was maintained, was calculated as a voltage retention. As a result, the voltage retention at 23° C. was 99.4%. Further, this liquid crystal cell was measured in the same manner also at a

TABLE 3

| Liquid crystal aligning agent | Resin components | Voltage retention (%) | | Accumulation charge (V) |
|---|---|---|---|---|
| | | 23° C. | 90° C. | |
| Ex. 6   Prep. Ex. 5 | CBDA/4,4'DADPA/p-PDA(50) | 98.9 | 84.3 | 0 |
| Ex. 7   Prep. Ex. 6 | CBDA/4,4'DADPA/BAPB(50) | 99.2 | 82.6 | 0 |
| Ex. 8   Prep. Ex. 7 | CBDA/4,4'DADPA/BAPB(70) | 98.7 | 81.7 | 0 |
| Ex. 9   Prep. Ex. 8 | CBDA/4,4'DADPA/p-PDA(90) | 98.5 | 79.8 | 0 |
| Ex. 10  Prep. Ex. 9 | CBDA/PMDA(20)/4,4'DADPA/p-PDA(50) | 98.9 | 81.6 | 0 |
| Ex. 11  Prep. Ex. 10 | BODA/4,4'DADPA | 98.3 | 85.6 | 0 |
| Ex. 12  Prep. Ex. 11 | BDA/4,4'DADPA | 99.2 | 94.6 | 0 |
| Ex. 13  Prep. Ex. 12 | CBDA/PMDA(50)/4,4'DADPA | 99.2 | 86.9 | 0 |
| Ex. 14  Prep. Ex. 13 | CBDA/PMDA(80)/4,4'DADPA | 99.0 | 82.0 | 0 |
| Ex. 15  Prep. Ex. 14 | TDA/4,4'DADPA {SPI} | 99.5 | 92.2 | 0.1 |
| Comp. Ex. 6   Comp. Prep. Ex. 6 | CBDA/p-PD | 97.8 | 70.6 | 0.4 |
| Comp. Ex. 7   Comp. Prep. Ex. 7 | CBDA/BAPB | 95.1 | 55.5 | 2.0 |
| Comp. Ex. 8   Comp. Prep. Ex. 8 | TDA/DAP {SPI} | 99.5 | 95.5 | 0.4 |

Preparation Example 15

18.83 g (0.096 mol) of CBDA as the tetracarboxylic dianhydride component and 13.95 g (0.07 mol) of 4,4'DADPA and 11.42 g (0.03 mol) of 1,3-diamino-4-[4-(4-heptylcyclohexyl)phenoxy]benzene, as the diamine component, were mixed in 250.4 g of NMP and reacted for 5 hours at room temperature to obtain a polyamic acid solution. The polymerization reaction proceeded easily and uniformly, and the reduced viscosity of the obtained polyamic acid was 0.69 dl/g. Further, NMP and BCS were added so that this solution comprised 5 wt % of the polyamic acid, 65 wt % of NMP and 30 wt % of BCS, to obtain a liquid crystal aligning agent of the present invention.

Example 16

The liquid crystal aligning agent of the present invention obtained in Preparation Example 15, was spin-coated on a glass substrate provided with transparent electrodes, dried for 5 minutes on a hot plate of 80° C. and then baked for 60 minutes in a hot air-circulation type oven of 210° C., to form a coated film having a film thickness of 100 nm thereby to obtain a substrate provided with a liquid crystal alignment film.

To evaluate the electrical characteristics of a liquid crystal cell, two sheets of the above substrate provided with a liquid crystal alignment film were prepared, a spacer of 6 μm was sprayed on the liquid crystal aligning film surface of one sheet, and then a sealing agent was printed thereon, whereupon the other substrate was bonded so that the liquid crystal alignment film surfaces faced each other, and then, the sealing agent was cured to prepare a void cell. To this void cell, negative liquid crystal MLC-6608 (manufactured by Merck Japan Limited) having a negative dielectric anisotropy, was injected by a reduced pressure injection method, and the injection inlet was sealed to obtain a liquid crystal cell. The liquid crystal of this liquid crystal cell was aligned vertically to the substrate.

Evaluation of Voltage Retention Characteristics

To the above liquid crystal cell, a voltage of 4 V was applied for 60 us at a temperature of 23° C., and the voltage after 16.67 ms was measured, whereby to what extent the voltage was maintained, was calculated as a voltage retention. As a result, the voltage retention at 23° C. was 99.4%. Further, this liquid crystal cell was measured in the same manner also at a temperature of 60° C. and at a temperature of 80° C. As a result, the voltage retention at 60° C. was 98.7%, and the voltage retention at 80° C. was 97.0%.

Evaluation of Charge Accumulation Characteristics

Rectangular waves of 30 Hz/±3 V having a DC voltage of 10 V superimposed, were applied to the above liquid crystal cell for 60 minutes at a temperature of 23° C., and the residual voltage remaining in the liquid crystal cell immediately after switching off the DC 10 V was measured by an optical flicker elimination method. As a result, the accumulation charge was 0 V.

INDUSTRIAL APPLICABILITY

From the liquid crystal aligning agent of the present invention, it is possible to obtain a liquid crystal alignment film which is excellent in the voltage retention characteristic and which has little accumulation charge without depending on the baking temperature. Further, the liquid crystal display device having a liquid crystal alignment film obtained from the liquid crystal aligning agent of the present invention, has excellent electrical characteristics, whereby it can be made to be a liquid crystal display device which is less susceptible to lowering of contract or to image persistence, and it is useful for display devices of various systems employing nematic liquid crystal, such as a TN device, a STN device, a TFT liquid crystal device and further an in-plane switching liquid crystal display device and a vertical alignment liquid crystal display device. Further, by selecting the liquid crystal to be used, it can be used also for ferroelectric and antiferroelectric liquid crystal display devices.

What is claimed is:

1. A liquid crystal aligning agent comprising at least one selected from the group consisting of
   a polyamic acid obtained by reactive polymerization of a tetracarboxylic dianhydride component with a diamine component, and
   a polyimide obtained by cyclodehydration of the polyamic acid;
   wherein from 20 to 100 mol % of the tetracarboxylic dianhydride component is at least one tetracarboxylic dianhydride selected from the group consisting of
   1,2,3,4-cyclobutanetetracarboxylic dianhydride, 2,3,5-tricarboxycyclopentylacetic dianhydride,
3,4-dicarboxy-1,2,3,4-tetrahydro-1-naphthalenesuccinic dianhydride,
bicyclo[3 3,0]octane-2,4,6,8-tetracarboxylic dianhydride and
1,2,3,4-butanetetracarboxylic dianhydride;
wherein from 10 to 100 mol % of the diamine component is a diamine represented by the following formula (1):

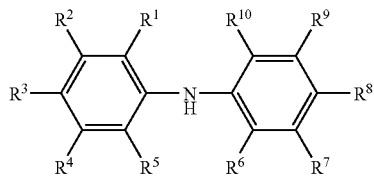

wherein two among $R^1$ to $R^{10}$ are primary amino groups, and the rest are hydrogen atoms or monovalent organic groups other than primary amino groups, provided that they may be the same or different from one another.

2. The liquid crystal aligning agent according to claim 1, wherein the tetracarboxylic dianhydride is 1,2,3,4-cyclobutanetetracarboxylic dianhydride or 3,4-dicarboxy-1,2,3,4-tetrahydro-1-naphthalenesuccinic dianhydride.

3. The liquid crystal aligning agent according to claim 1 or 2, wherein the diamine represented by the formula is 4,4'-diaminodiphenylamine.

4. A liquid crystal alignment film made of a coated film obtained by applying the liquid crystal aligning agent as defined in claim 3 on a substrate, followed by drying and baking.

5. A liquid crystal display device having a liquid crystal alignment film obtained from the liquid crystal aligning agent as defined in claim 3.

6. A liquid crystal display device having a liquid crystal alignment film obtained from the liquid crystal aligning agent as defined in claim 2.

7. A liquid crystal alignment film made of a coated film obtained by applying the liquid crystal aligning agent as defined in claim 2 on a substrate, followed by drying and baking.

8. A liquid crystal display device having a liquid crystal alignment film obtained from the liquid crystal aligning agent as defined in claim 2.

9. A liquid crystal alignment film made of a coated film obtained by applying the liquid crystal aligning agent as defined in claim 1 on a substrate, followed by drying and baking.

10. A liquid crystal display device having a liquid crystal alignment film obtained from the liquid crystal aligning agent as defined in claim 9.

11. The liquid crystal aligning agent of claim 1, comprising the polyamic acid obtained by reactive polymerization of a tetracarboxylic dianhydride component with a diamine component.

12. The liquid crystal aligning agent of claim 1, comprising the polyimide obtained by cyclodehydration of the polyamic acid.

13. The liquid crystal aligning agent of claim 1, comprising the polyamic acid obtained by reactive polymerization of a tetracarboxylic dianhydride component with a diamine component and the polyimide obtained by cyclodehydration of the polyamic acid.

14. The liquid crystal aligning agent of claim 1, comprising the polyamic acid obtained by reactive polymerization of a tetracarboxylic dianhydride component with a diamine component, wherein the tetracarboxylic dianhydride comprises 1,2,3,4-cyclobutanetetracarboxylic dianhydride.

15. The liquid crystal aligning agent of claim 1, comprising the polyamic acid obtained by reactive polymerization of a tetracarboxylic dianhydride component with a diamine component, wherein the tetracarboxylic dianhydride comprises 3,4-dicarboxy-1,2,3,4-tetrahydro-1-naphthalenesuccinic dianhydride.

* * * * *